United States Patent [19]

Williams et al.

[11] Patent Number: 5,102,924

[45] Date of Patent: Apr. 7, 1992

[54] POLYMERIC MIXTURES AND PROCESS THEREFOR

[75] Inventors: Jerry W. Williams, Cottage Grove; Robert J. DeVoe, St. Paul, both of Minn.

[73] Assignee: Minnesota Mining and Manufacturing Company, St. Paul, Minn.

[21] Appl. No.: 568,088

[22] Filed: Aug. 16, 1990

[51] Int. Cl.⁵ ............................ C08F 4/80; C08F 2/48; C08G 18/22
[52] U.S. Cl. .......................................... 522/4; 522/15; 522/29; 522/174
[58] Field of Search ................... 522/4, 29, 174, 15

[56] References Cited

U.S. PATENT DOCUMENTS

| | | | |
|---|---|---|---|
| 3,833,404 | 9/1974 | Sperling et al. | 117/63 |
| 3,855,040 | 12/1974 | Malofsky | 156/310 |
| 4,342,793 | 8/1982 | Skinner et al. | 427/44 |
| 4,424,252 | 1/1984 | Nativi | 522/4 |
| 4,446,246 | 5/1984 | McGinnis | 502/155 |
| 4,525,232 | 6/1985 | Rooney et al. | 156/273.3 |
| 4,525,553 | 6/1985 | Rooney et al. | 526/120 |
| 4,544,466 | 10/1985 | Lindstrom | 522/174 |
| 4,549,945 | 10/1985 | Lindstrom | 522/66 |
| 4,707,432 | 11/1987 | Gatechair et al. | 522/29 |
| 4,740,577 | 4/1988 | DeVoe et al. | 522/29 |
| 4,787,850 | 11/1988 | Michl et al. | 433/201.1 |
| 4,849,320 | 7/1989 | Irving et al. | 430/280 |
| 4,898,899 | 2/1990 | Isobe | 524/89 |
| 4,950,696 | 8/1990 | Palazotto et al. | 522/174 |
| 4,985,340 | 1/1991 | Palazzotto et al. | 522/174 |

FOREIGN PATENT DOCUMENTS

| | | |
|---|---|---|
| 0096500 | 12/1983 | European Pat. Off. |
| 0172330 | 2/1986 | European Pat. Off. |
| 335629 | 10/1989 | European Pat. Off. |
| 344910 | 12/1989 | European Pat. Off. |
| 344911 | 12/1989 | European Pat. Off. |
| 3844029 | 7/1989 | Fed. Rep. of Germany |
| WO88/02879 | 4/1988 | PCT Int'l Appl. |
| 2110705 | 6/1983 | United Kingdom |

Primary Examiner—Marion E. McCamish
Assistant Examiner—Susan Berman
Attorney, Agent, or Firm—Gary L. Griswold; Walter N. Kirn; Lorraine R. Sherman

[57] ABSTRACT

A tough polymeric mixture comprises the polymerized product of admixture I or II, wherein admixture I comprises 5 to 45 weight percent of a first monomer and a photoinitiator therefor, said first monomer being at least one free-radically polymerizable monomer, and 95 to 55 weight percent of a second monomer and a photoinitiator therefor, said second monomer being at least one set of polyurethane precursors, and admixture II comprises 5 to 45 weight percent of a first monomer and a photoinitiator therefor, said first monomer being at least one set of polyurethane precursors, and 95 to 55 weight percent of a second monomer and a photoinitiator therefor, said second monomer being at least one free-radically polymerizable monomer, said polymeric mixture having been prepared by a process involving two sequential actinic radiations of wavelengths ranges centered around $\lambda_1$ and $\lambda_2$, respectively, wherein $\lambda_1$ and $\lambda_2$ differ from each other by at least 30 nm, and wherein the actinic radiation centered $\lambda_1$ does not substantialy polymerize the second monomer, and wherein the area under a stress-strain curve as determined by ASTM D638-89 for said polymeric mixture is at least 10 percent greater, preferably 20 percent greater, and more preferably at least 50 percent greater when said precursor monomers are cured by said sequential photoinitiation process compared to when the same mixture is cured by a single photostage cure.

20 Claims, No Drawings

POLYMERIC MIXTURES AND PROCESS THEREFOR

FIELD OF THE INVENTION

This invention relates to tough polymeric mixtures and to a process for providing tough, durable polymeric mixtures comprising a free-radically polymerized monomer in combination with a polyurethane. The polymeric mixtures are useful as vibration damping materials, as protective coatings, and as tough self-supporting films.

BACKGROUND OF THE INVENTION

Various polymeric coatings and articles are produced in processes involving use of organic solvents. Such processes require a latent catalyst or latent reaction promoter which can be activated in a controlled fashion. There is an intense effort by environmentalists, researchers, law makers, and industry to promote high solids and 100% solids formulations and processes to reduce or eliminate use of such solvents and attendant costs and environmental contamination.

WO 8802879 teaches a free-radically polymerizable composition comprising a free-radically polymerizable material and a photoinitiator system comprising a free-radical photoinitiator and a ferrocenium salt. The composition may contain one or more cationically polymerizable materials. No detail is provided as to the nature of these cationically polymerizable materials, nor do they teach sequential exposure to actinic radiation. Polyurethane precursors are not disclosed.

U.S. Pat. No. 4,849,320 teaches an imaging system containing a combination of two different photoinitiators used with two different polymerizable monomers in combination with irradiation at two substantially different wavelengths. The monomers can be acrylates and epoxies or other cationically polymerizable monomers and the photoinitiators can include ferrocinium, onium salts or an alpha cleavage or homolytic bond cleavage photoinitiator. Polyurethane precursors are not disclosed.

EPO 335,629 discloses photoresists and printing plates comprising cationically polymerizable materials (epoxy) in combination with free-radically polymerizable materials, and photoinitiators for both materials. A photopolymerization process involving exposure to varied wavelengths of radiation is also disclosed. No polyurethane precursors are taught.

EPO 344,910 discloses a photopolymerizable composition comprising a polymeric precursor, an optional photosensitizer and a two-component curing agent. The polymeric precursors are selected from ethylenically unsaturated monomers, or an ethylenically unsaturated monomer and one of epoxy and polyurethane precursors. The curing agent contains an organometallic salt and an onium salt. Similarly, EPO 344,911 discloses a polymerizable composition comprising a polymeric precursor, a curing agent containing an organometallic salt and a solvent. The polymeric precursors are selected from ethylenicallyunsaturated monomers alone, and in combination with either polyurethane precursors or epoxy monomers. There is no teaching that sequential photocuring can provide a polymer mixture with superior toughness.

U.S. Pat. Nos. 4,342,793 and 4,787,850 disclose compositions containing unsaturated monomers and polyurethane precursors wherein the unsaturated monomers are radiation-curable. Radiation-curing of the polyurethane precursors is not taught.

U.S. Pat. No. 3,833,404 discloses a viscoelastic layer for use in a damping means for a vibratory part, the layer being an interpenetrating polymeric network which is broadly stated to consist essentially of a polyurethane and a poly(methacrylate). There is no disclosure to a sequential photocuring process and the benefits that can be derived therefrom.

SUMMARY OF THE INVENTION

Briefly, the present invention provides a tough polymeric mixture cured by a sequential photoinitiation process, wherein said polymeric mixture comprises the polymerized product of 5 to 45 weight percent of a first monomer and a photoinitiator therefor, the first monomer being one of 1) a free-radically polymerizable monomer and 2) a set of polyurethane precursors, and 95 to 55 weight percent of a second monomer and a photoinitiator therefor, the second monomer being the member of 1) and 2) that is not selected as the first monomer, and wherein the area under a stress-strain curve as determined by ASTM D638-89 for said polymeric mixture is at least 10 percent greater, preferably 20 percent greater, and more preferably at least 50 percent greater, and most preferably at least 70 percent greater when said precursor monomers are cured by said sequential photoinitiation process compared to that mixture when cured by a single photostage process.

In another aspect, this invention provides a process for preparing the tough polymer mixture of the invention comprising the steps:

a) providing admixture I or II
 wherein
  admixture I comprises 5 to 45 weight percent of a first monomer and a photoinitiator therefor, said first monomer being at least one free-radically polymerizable monomer, and 95 to 55 weight percent of a second monomer and a photoinitiator therefor, said second monomer being at least one set of polyurethane precursors, and
  admixture II comprises 5 to 45 weight percent of a first monomer and a photoinitiator therefor, said first monomer being at least one set of polyurethane precursors, and 95 to 55 weight percent of a second monomer and a photoinitiator therefor, said second monomer being at least one free-radically polymerizable monomer, and b) exposing sequentially said admixture I or II to first and second actinic radiations of wavelength ranges centered around $\lambda_1$ and $\lambda_2$, respectively, wherein said first actinic radiation activates said photoinitiator of said first monomer without substantially activating said photoinitiator for said second monomer, and wherein said second actinic radiation activates said photoinitiator for said second monomer, and wherein $\lambda_1$ and $\lambda_2$, differ from each other by at least 30 nm, preferably there is a difference in the range 30 to 700 nm, more preferably there is a difference in the range of 30 to 500 nm, and most preferably there is a difference in the range of 30 to 350 nm, and wherein the first actinic radiation does not substantially polymerize the second monomer, and wherein the area under a stress-strain curve as determined by ASTM D638-89 for said polymeric mixture is at least 10 percent greater, preferably at least 20 percent greater, and more preferably at least 50 percent greater, and most preferably at least 70 percent greater when said precursor monomers are cured by said sequential photoinitiation process compared to when cured by a single photostage curing process.

It is to be appreciated that actinic radiation generally represents a range of wavelengths known as a band width. Sequential radiations can have portions of their band widths overlapping, but $\lambda_1$ and $\lambda_2$ differ by at least 30 nm.

It has been found preferable, in order to provide a tough polymer mixture, to expose the monomer present in lesser amount to a first actinic radiation, and to expose the monomer present in greater amount to a second and subsequent actinic radiation. The two exposures are sequential in time, it being most preferred to have the second exposure immediately follow the first exposure. It may be desirable in some embodiments to subject the admixture to heat (subsequent, concurrent, or prior) to one or both of the exposures to actinic radiation.

By subjecting the polymerizable compositions of the invention to a sequential photoinitiation process via application of sufficient energy in the form of a combination of wavelengths of actinic radiation, photochemically reactive species catalyze both polyurethane formation and initiate free-radical polymerization. While certain cationic photoinitiators such as organometallic complex salts will photoinitiate both polymerizations, they are not extremely efficient free-radical photoinitiators, and it is more efficient to use a separate free-radical initiator to initiate the free-radical reaction. The process requires no drying ovens to remove solvents and provides essentially no volatile matter.

In another aspect, the present invention provides a vibration-damping constrained-layer construction which is a laminate of one or more stiff layers or substrates and one or more layers of a tough polymeric mixture according to the present invention comprising a free-radically polymerized monomer and a polyurethane to damp vibrations of component parts of a device or structure. The constrained-layer construction is affixed by mechanical or adhesive means to a solid article in need of vibration damping. These constructions comprise:

A. a stiff layer or substrate which is any web or sheet having a stiffness of at least 0.40 (relative to stainless steel) that causes it to resonate in response to an internal or external applied force, and B. a layer of viscoelastic polymer which is a polymeric network derived from free-radically polymerizable monomers and urethane precursors having a storage modulus, G', above $1 \times 10^6$ dynes per square centimeter and a loss tangent, tan $\delta$, above 0.5, preferably above 0.6, at temperatures in the range of $-60$ to $180°$ C., preferably in the range of 50 to 150° C., and at frequencies of 20,000 Hertz or less, said layer having a thickness in the range of 0.01 to 100 mm.

In yet another aspect, this invention provides a protective coating on a support.

In a still further aspect, this invention provides a tough self-supporting film comprising the inventive polymerized mixture.

In this application:

"sequential photoinitiation process" or "sequential photocuring process" means photoinitiation of polymerization by irradiating a polymerizable mixture with actinic radiation which stimulates photochemically an initiator or catalyst for one of reactive species selected from polyurethane precursors and free-radical photopolymerizable monomers, followed by irradiation of the mixture with actinic radiation to stimulate photochemically the initiator of the other reactive species;

"single photostage curing" means curing monomers by one exposure to actinic radiation from a single light source;

"energy-induced curing" means curing by means of electromagnetic radiation (ultraviolet and visible), and thermal (infrared and heat) means or any combination thereof such as heat and light simultaneously, or in any sequence, e.g., heat followed by light, light followed by heat followed by light, and the like;

"free-radically polymerizable monomer" means at least one monomer that polymerizes by a free-radical mechanism; the monomer can be bifunctional and includes acrylates and methacrylates, vinyl esters, vinyl aromatic compounds, etc.;

"polyurethane precursors" or a "set of polyurethane precursors" means a polymerizable mixture of one or more monomers selected from diisocyanates and polyisocyanates, and one or more monomers bearing at least two isocyanate-reactive groups. The preferred isocyanatereactive groups are hydroxyl groups. The ratio of isocyanate groups to isocyanate-reactive groups can be from 1:2 to 2:1;

"bifunctional monomer" means a monomer that contains at least two free-radically polymerizable groups;

"bireactive monomer" means those monomers which contain both at least one free-radically polymerizable group and at least one isocyanate or isocyanate-reactive group;

"group" means a chemical species that allows for substitution or which may be substituted by conventional substituents which do not interfere with the desired product, e.g., substituents can be alkoxy, phenyl, halo (F, Cl, Br, I), cyano, nitro, etc.;

each of wavelengths "$\lambda_1$ and $\lambda_2$" represents a useful local maximum intensity;

"actinic radiation" means electromagnetic radiation in the range of 200 to 900 nm that is capable of initiating a chemical reaction; preferably actinic radiation means visible and ultraviolet radiation;

"catalytically-effective amount" means a quantity sufficient to effect polymerization of the curable composition to a polymerized product at least to a degree to cause an increase in the viscosity of the composition under the conditions specified;

"organometallic salt" means an ionic salt of an organometallic complex cation, wherein the cation contains at least one carbon atom of an organic group which is bonded to a metal atom of a transition metal series (*Basic Inorganic Chemistry*, F. A. Cotton, G. Wilkinson, Wiley: NY, 1976, p 497);

"transition metal series" means those metals in the Periodic Table Groups 4, 5, 6, 7, 8, 9, and 10 (as designated in the IUPAC system); and "photoinitiator system" means a combination of at least one free-radical polymerization photoinitiator and at least one photocatalyst for polymerization of polyurethane precursors; and "photoinitiator" and "photocatalyst" are used interchangeably in this application.

While not being bound by theory, it is believed that compositions comprising preferred ratios of free-radically polymerizablemmonomer(s), polyurethane precursors, and photoinitiator system allows formation of a multiphase material with high levels of mixing of the two polymers. Some systems will form a semi interpenetrating polymer network (semi-IPN); some systems a true IPN. Existence of the multiphase structure provides improved toughness and may provide increased strength.

DETAILED DISCLOSURE OF PREFERRED EMBODIMENTS OF THE INVENTION

Free-radically polymerizable monomers useful in the present invention preferably can be selected from acrylate, methacrylate, and vinyl ester functionalized materials. Of particular use are acrylate and methacrylate materials. They can be monomers and/or oligomers such as (meth)acrylates, (meth)acrylamides, N-vinylpyrrolidone and vinylazlactones as disclosed in U.S. Pat. No. 4,304,705. Such monomers include mono-, di-, or polyacrylates and methacrylates such as methyl acrylate, methyl methacrylate, ethyl acrylate, isopropyl methacrylate, isooctyl acrylate, isobornyl acrylate, isobornyl methacrylate, acrylic acid, n-hexyl acrylate, tetrahydrofurfuryl acrylate, N-vinylcaprolactam, N-vinylpyrrolidone, acrylonitrile, stearyl acrylate, allyl acrylate, glycerol diacrylate, glycerol triacrylate, ethylene glycol diacrylate, diethylene glycol diacrylate, triethylene glycol dimethacrylate, 1,6-hexanediol diacrylate, 1,3-propanediol diacrylate, 1,3-propanediol dimethacrylate, trimethylolpropane triacrylate, 1,2,4-butanetriol trimethacrylate, 2-phenoxyethyl acrylate, 1,4-cyclohexanediol diacrylate, pentaerythritol triacrylate, pentaerythritol tetraacrylate, pentaerythritol tetramethacrylate, sorbitol hexaacrylate, bis[1-(2-acryloxy)]-p-ethoxyphenyldimethylmethane, 2,2-bis[1-(3-acrlloxy-2-hydroxy)]propoxyphenylpropane, tris(hydroxyethyl)isocyanurate trimethacrylate; the bis-acrylates and bis-methacrylates of polyethylene glycols of molecular weight 200-500, copolymerizable mixtures of acrylated monomers such as those disclosed in U.S. Pat. No. 4,652,274, and acrylated oligomers such as those disclosed in U.S. Pat. No. 4,642,126.

Polymerizable compositions of the invention may contain ratios (weight percent) of free-radically polymerizable monomers to polyurethane precursors of 95:5 to 55:45 and 45:55 to 5:95. Preferred compositions contain ratios of from about 95:5 to 55:45. Highly preferred compositions contain ratios of from about 90:10 to about 60:40. At these highly preferred ratios, preferred polymeric mixtures of this invention exhibit superior durability and toughness properties when compared to those properties of polymeric mixtures cured by single photostage curing.

It is preferred that each polymer in the polymeric mixture be independently crosslinked. It is less preferred, but useful mixtures do result, when only the first polymerized component (which is present in lesser amount) of the mixture is crosslinked. This can be accomplished by providing in the range of 0.05 to 75 weight percent, more preferably 0.1 to 50 weight percent of each of polyurethane precursors and free-radically polymerizable monomers with polymerizable functionality greater than 2. It frequently is advantageous to use a different weight percent multifunctional monomer for each precursor. The degree of crosslinking can be varied depending on the intended application. Particularly useful as crosslinkers are polyurethane precursors such as Desmodur N ™ polyisocyanates (Mobay Corp.), the biuret of isophorone diisocyanate, isocyanurates of tolylene diisocyanates, mixed isocyanurate of tolylene diisocyanate and hexamethylene diisocyanate, and reaction product of 1 mole of trimethylol propane and 3 moles of tolylene diisocyanate.

Particularly useful as crosslinkers are compounds having isocyanate reactive functionality greater than 2.05, e.g., trimethylol propane, trimethylol ethane, glycerol, 1,2,6-hexanetriol, and pentaerythritol.

Particularly useful as crosslinkers are acrylates such as allyl acrylate, glycerol diacrylate, glycerol triacrylate, ethylene glycol diacrylate, diethylene glycol diacrylate, triethylene glycol dimethacrylate, 1,6-hexanediol diacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraarrylate, pentaerythritol tetramethacrylate, sorbitol hexaacrylate, bis[1-(2-acryloxy)]-p-ethoxyphenyldimethylmethane, 2,2-bis[1-(3-acryloxy-2-hydroxy)]propoxyphenylpropane, tris(hydroxyethyl)isocyanurate trimethacrylate; and the bis-acrylates and bis-methacrylates of polyethylene glycols of molecular weight 200-500.

The polyurethane precursors useful in the present invention comprise an isocyanate component containing at least two isocyanate groups and an isocyanate-reactive component containing at least two isocyanate-reactive hydrogen atoms which preferably are polyols.

The polyisocyanate component of the polyurethane precursors may be any aliphatic, cycloaliphatic, araliphatic, aromatic or heterocyclic polyisocyanate, or any combination of such polyisocyanates.

Particularly suitable polyisocyanates correspond to the formula

$$Q(NCO)_p \qquad\qquad I$$

in which p is an integer 2, 3, or 4, and Q represents a di-, tri-, or tetravalent-radical aliphatic hydrocarbon containing from 2 to 100 carbon atoms and zero to 50 heteroatoms, a cycloaliphatic hydrocarbon radical containing from 4 to 100 carbon atoms and zero to 50 heteroatoms, an aromatic hydrocarbon radical or heterocyclic aromatic radical containing from 5 to 15 carbon atoms and zero to 10 heteroatoms, or an araliphatic hydrocarbon radical containing from 8 to 100 carbon atoms and zero to 50 heteroatoms. The heteroatoms that can be present in Q include non-peroxidic oxygen, sulfur, non-amino nitrogen, halogen, silicon, and non-phosphino phosphorus.

Examples of such polyisocyanates include, but are not limited to: ethylene diisocyanate, 1,4tetramethylene diisocyanate, 1,6-hexamethylene diisocyanate, trimethylhexamethylene diisocyanate, 1,12-dodecane diisocyanate, cyclobutane-1,3-diisocyanate, 1-isocyanato-3,3,5-trimethyl-5-isocyanatomethylcyclohexane, 2,4- and 2,6-hexahydro-1,3-phenylene diisocyanate and 2,4-and 2,6-hexahydro-1,4-phenylene diisocyanate, and mixtures of these isomers, perhydro-2,4'- and 4,4'-diphenylmethane diisocyanate and mixtures of these isomers, 1,3- and 1,4-phenylene diisocyanate, 2,4- and 2,6-tolylene diisocyanate and mixtures of these isomers, 2,4'- and 4,4'-diphenylmethane diisocyanate, and mixtures of these isomers, naphthalene-1,5-diisocyanate, and the reaction products of four equivalents of the above stated isocyanate-containing compounds with compounds containing two isocyanate-reactive groups.

It is also within the scope of the present invention to use, e.g., triphenylmethane-4,4',4,4',4"-triisocyanate, polyphenyl polymethylene polyisocyanates, as described in G.B. Nos. 874,430, and 848,671, both of which are incorporated herein by reference. Also useful are meta- and para-isocyanatophenylsulfonyl isocyanates, perchlorinated aryl polyisocyanates, polyisocyanates containing carbodiimide groups, norbornane diisocyanates, polyisocyanates containing allophanate groups, polyisocyanates containing isocyanurate groups, polyisocyanates containing urethane groups, polyisocyanates containing acrylated urea groups, polyisocyanates containing biuret groups, polyisocyanates producted by telomerization reactions of the type described in, inter alia, U.S. Pat. No. 3,654,106, polyisocyanates containing ester groups, polyisocyanates containing polymeric fatty acid groups, and reaction products of any of the above-mentioned diisocyanates with acetals according to German Patent No. 1,072,385, incorporated herein by reference, or mixtures of any of the above polyisocyanates.

Also useful are blocked polyisocyanates, many of which are commercially available, wherein the blocking group can be, e.g., phenol, epsilon-caprolactam, hydroxamic acid ester, ketoxime, t-butyl acetoacetate and others disclosed in Wicks, Z. W., Jr. *Progess in Organic Coatings* 1981, 9, 3–28.

Preferred polyisocyanates are aliphatic, such as hexamethylene diisocyanate, the isocyanurate and the biuret thereof such as Desmodur N TM from Mobay Corp., 4,4'-methylenebis(cyclohexyl isocyanate); 1-isocyanato-3,3,5-trimethyl-5-isocyanatomethylcyclohexane (isophorone diisocyanate) and the biurets thereof; the tolylene diisocyanates and the isocyanurates thereof; the mixed isocyanurate of tolylene diisocyanate and hexamethylene diisocyanate; the reaction product of one mole of trimethylolpropane and 3 moles of tolylene diisocyanate and crude diphenylmethane diisocyanate.

Suitable isocyanate-reactive groups contain at least two isocyanate-reactive hydrogen atoms. They can be high or low molecular weight compounds having a weight average molecular weight of from about 50 to about 50,000. Useful compounds are those including amino groups, thiol groups, carboxyl groups, ahd hydroxyl groups.

Preferably, isocyanate-reactive compounds contain hydroxyl groups, particularly compounds containing from about 2 to 50 hydroxyl groups, and more particularly, compounds having a weight average molecular weight of from about 200 to 25,000, more preferably from about 200 to 20,000, for example, polyesters, polyethers, polythioethers, polyacetals, polycarbonates, poly(meth)acrylates, and polyester amides, containing at least 2, generally from about 2 to 8, but preferably from about 2 to 4 hydroxyl groups, or even hydroxyl-containing prepolymers of these compounds. Representatives of the above-mentioned compounds used in accordance with the present invention are described, for example, in Saunders, J. H.; Frisch, K. C., *Polyurethanes, Chemistry and Technology*; High Polymers XVI; Wiley-Interscience: New York, 1962, and in *Kunststoff-Handbuch*; Viewig-Hochtlen, R., Ed.; Carl-HanserVerlag: Munich, 1966; Vol. 1, pp 45–71. It is, of course, possible to use mixtures of the above-mentioned compounds containing at least two hydroxyl groups and having a molecular weight of from about 50 to 50,000 for example, mixtures of polyethers and polyesters. In some cases, it is particularly advantageous to combine low-melting and high-melting polyhydroxyl containing compounds with one another (see, for example, German Offenlegungsschrift No. 2,706,297).

Low molecular weight compounds containing at least two reactive hydroxyl groups (molecular weight from about 50 to 400) suitable for use in accordance with the present invention are compounds preferably containing from about 2 to 8, more preferably from about 2 to 4 reactive hydroxyl groups. It is also possible to use mixtures of different compounds containing at least two hydroxyl groups and having a molecular weight in the range of from about 50 to 400. Examples of such compounds are ethylene glycol, 1,2- and 1,3-propylene glycol, 1,4- and 2,3-butylene glycol, 1,5-pentanediol, 1,6-hexanediol, 1,8-octanediol, neopentyl glycol, 1,4-bis(hydroxymethyl)cyclohexane, 2-methyl-1,3-propanediol, dibromobutanediol, glycerol, trimethylolpropane, 1,2,6-hexanetriol, trimethylolethane, pentaerythritol, quinitol, mannitol, sorbitol, diethylene glycol, triethylene glycol, tetraethylene glycol, higher polyethylene glycols, dipropylene glycol, higher polypropylene glycols, dibutylene glycol, higher polybutylene glycols, 4,4'-dihydroxydiphenylpropane and dihydroxymethylhydroquinone.

Other polyols suitable for the purposes of the present invention are the mixtures of hydroxy aldehydes and hydroxy ketones ("formose") or the polyhydric alcohols obtained therefrom by reduction ("formitol") which are formed in the autocondensation of formaldehyde, polymers thereof and hydrates thereof, in the presence of metal compounds as catalysts and compounds capable of enediol formation as co-catalysts (disclosed, for example, in German Offenlegungsschrift Nos. 2,639,084; 2,714,084; 2,714,104; 2,721,186; 2,738,154; and 2,738,512).

Useful polyfunctional alcohols include poly(ethylene glycol), e.g., Carbowax TM polyether glycols (Union Carbide), poly(propylene glycol), and poly(tetramethylene glycol) such as Terathane TM polyether glycols (Dupont).

Other useful isocyanate-reactive compounds are disclosed in Saunders, J. H.; Frisch, K. C., *Polyurethanes, Chemistry and Technology*; High Polymers XVI; Wiley-Interscience: New York, 1962, and *Kunstoff-Handbuch*; Viewig-Hochtlen, R., Ed.; Carl-HanserVerlag: Munich, 1966; Vol. 1, pp 45–71.

Preferred isocyanate-reactive compounds are polyols having molecular weights in the range from 200 to 20,000 grams per mole, and containing two or more primary hydroxyl groups per molecule. The preferred polyols can be divided into four groups. The first three groups consist of commerically available polyols. These include polyether polyols, polyester polyols, and acrylic polyols.

Preferred polyester polyols include Desmophen TM 670-80; Desmophen TM 670-100, Desmophen TM 800, and 1100, all available from Mobay Corporation. Also preferred are certain polyester polyols available from Union Carbide Corp. under the trademark Tone TM, i e., Tone TM 200, 210, 230, 240, 260, 301, 305, and 310.

Preferred polyether diols include Carbowax 400, 600, 800, 1000, 3350, 8000, and 20000, and Terathane TM 1000 and Terathane TM 2000.

A preferred acrylic polyol is Joncryl TM 587, available from S. C. Johnson & Son, Inc. Other preferred polyols include alkyl and cycloalkyl polyols, e.g., 2,5hexanediol, 1,6-hexanediol, ethylene glycol, Dimerol TM, a 36 carbon essentially linear diol available from General Mills Chemicals, Inc., glycerol, 1,2,6-hexanetriol, pentaerythritol, and 1,4-cyclohexanediol.

The fourth group of preferred polyols consists of hydroxyalkylated bisphenol derivatives. Preferred diols in this group have the following formula:

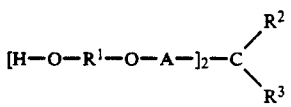

where $R^1$ is either a straight or branched or cyclic alkylene (such as methylene, ethylene, and decylene) group consisting of 1 to 10 carbon atoms or an aralkylene group consisting of 7 to 14 carbon atoms such as benzylidene,

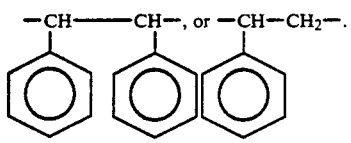

$R^2$ and $R^3$ independently may be an alkyl group, aralkyl group, cycloalkyl group, alkaryl group, or an aryl group of 1 to 30 carbon atoms (preferably methyl, ethyl, and trifluoromethyl), and none or 1 to 10 heteroatoms, and $R^2$ and $R^3$ together can comprise an alkylene, cycloalkylene group, arylene group, preferably

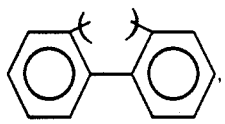

alkarylene group, or aralkylene group containing 2 to 660 carbon atoms, and none or 1 to 10 heteroatoms. A can be a substituted or unsubstituted arylene group, preferably having 6 to 12 carbon atoms, most preferably p-phenylene, o-phenylene, and dimethylnaphthylene.

Specific preferred hydroxyalkylated bisphenols are 9,9-bis-4-(2-hydroxyethoxyphenyl)fluorene (hydroxyethylated bisphenol of fluorenone), 2,2-bis-4-(2-hydroxyethoxyphenyl)butane (hydroxyethylated bisphenol of butanone), 2,2-bis-4-(2-hydroxyethoxyphenyl)hexafluoropropane (hydroxyethylated bisphenol F), and 1,2-bis-4-(2-hydroxyethoxyphenyl)propane, 2,2-bis-4-(2-hydroxyethoxyphenyl)norbornane, 2,2-bis-4-(2-hyroxyethoxyphenyl)-5,6-cyclopentanorbornane and 1,1-bis-4-(2-hydroxyethoxyphenyl)cyclohexane.

Another group of monomers which are useful in compositions of the invention are bireactive monomers which serve as crosslinkers, i.e., those that possess at least one free-radically polymerizable group and one isocyanate or isocyanate-reactive functionality. Such monomers include, for example, 2-isocyanatoethyl methacrylate, 3-isopropenophenyl isocyanate, hydroxyethyl acrylate, hydroxyethyl methacrylate, hydroxypropyl methacrylate and hydroxybutyl acrylate. Bireactive monomers comprise up to 25 mole percent of the isocyanate or isocyanate-reactive groups, preferably they comprise less than 5 mole percent of the isocyanate or isocyanate reactive groups, and up to 50 mole percent of free-radically polymerizable monomers, preferably less than 25 mole percent of free-radically polymerizable monomers. Most preferably, the compositions are free of bireactive monomers.

Urethane photocatalysts include electron withdrawing group-substituted diazonium salts as described in U.S. Pat. No. 4,544,466, and salts of organometallic complex cations such as are disclosed in U.S. Pat. No. 4,740,577. The preferred class of initiators are organometallic complex salts which are disclosed in detail in U.S. Pat. No. 4,740,577, col. 3, line 39, to col. 12, line 40, which is incorporated herein by reference.

M, the metal atom in the cationic portion of the organometallic salt, can be any transition metal from Periodic Groups 4, 5, 6, 7, 8, 9, and 10 (IUPAC system) such as, for example, Ti, Zr, Hf, V, Nb, Ta, Cr, Mo, W, Mn, Tc, Re, Fe, Ru, Os, Co, Rh, Ir, Ni, Pd and Pt. In the preferred compositions, M is Co, Fe, Mn, Re, Mo or Cr. In the most preferred compositions, M is Fe.

Illustrative of preferred anions are $B(phenyl)_4^-$, $B(phenyl)_3(alkyl)^-$, where alkyl can be ethyl, propyl, butyl, hexyl and the like, $BF_4^-$, $PF_6^-$, $ASF_6^-$, $ZrF_6^-$, and sulfonates such as $CF_3SO_3^-$, $C_8F_{17}SO_3^-$, $SO:$ p-toluenesulfonate, and p-chlorobenzenesulfonate, etc. More preferably, the anions are $BF_4^-$, $PF_6^-$, $SbF_6^-$, $SbF_5OH^-$, $AsF_6^-$, and $SbCL_6^-$.

Preferred salts of organometallic complex cations useful in the compositions of the invention are those having the formula $[(L^5)(L^6)M]^+ \cdot X_f$, where $L^5$ is selected from the class of substituted and unsubstituted aromatic compounds based on a benzene or cyclopentadienyl nucleus, $L^6$ which optionally is present can be a group donating an even number of sigma electrons (such as CO, $NO^+$, substituted or unsubstituted phosphines, phosphites), M is Fe, e is 1 or 2 and $X_f$ is tetrafluoroborate, hexafluorophosphate, hexafluoroarsenate or hexafluoroantimonate.

Examples of preferred salts of organometallic complex cations useful in the composition of the invention include the following:

(eta$^6$-benzene)(eta$^5$-cyclopentadienyl)iron(1+) hexafluoroantimonate (eta$^6$-toluene)(eta$^5$-cyclopentadienyl)iron(1+) hexafluorophosphate (eta$^6$-cumene)(eta$^5$-cyclopentadienyl)iron(1+) hexafluorophosphate (eta$^6$-p-xylene)(eta$^5$-cyclopentadienyl)iron(1+) hexafluorophosphate (eta$^6$-o-xylene)(eta$^5$-cyclopentadienyl)iron(1+) hexafluorophosphate (eta$^6$m-xylene)(eta$^5$-cyclopentadienyl)iron(1+) hexafluorophosphate (eta$^6$-mesitylene)(eta$^5$-cyclopentadienyl)iron(1+) hexafluoroantimonate (eta$^6$-naphthalene)(eta$^5$cyclopentadienyl)iron(1+) hexafluoroantimonate (eta$^6$-pyrene)(eta$^5$-cyclopentadienyl)iron(1+) hexafluoroantimonate (eta$^6$-perylene)(eta$^5$-cyclopentadienyl)iron(1+) hexafluoroantimonate (eta$^6$-chrysene)(eta$^5$-cyclopentadienyl)iron(1+) hexafluoroantimonate (eta$^6$-acetophenone)(eta$^5$methylcyclopentadienyl)iron(1+) hexafluoroantimonate (eta$^6$-fluorene)(eta$^5$-cyclopentadienyl)iron(1+) hexafluoroantimonate bis(eta$^6$-mesitylene)iron(2+) hexafluoroantimonate.

Electron withdrawing group substituted diazonium salts useful as urethane photocatalysts are those disclosed in U.S. Pat. No. 4,544,466 and include p-chlorobenzenediazonium tetrafluoroborate,
p-chlorobenzenediazonium hexafluorophosphate,
p-bromobenzenediazonium hexafluorophosphate,
p-fluorobenzenediazonium hexafluorophosphate,
p-iodobenzenediazonium hexafluoroarsenate,
p-nitrobenzenediazonium hexafluoroarsenate,
p-nitrobenzenediazonium tetrafluoroborate,
2,4-dichlorobenzenediazonium tetrafluoroborate,
2,4-dibromobenzenediazonium hexafluoroarsenate,
2,4-dichlorobenzenediazonium hexafluorophosphate,
2,4-dichlorobenzenediazonium pentafluorostannate,
2,4-dichlorobenzenediazonium hexafluorobismuthate,
2,4,6-trichlorobenzenediazonium tetrafluoroborate,
2,4,6-trichlorobenzenediazonium hexafluorophosphate,
2,4,6-trichlorobenzenediazonium hexafluoroarsenate,
2,4,6-trichlorobenzenediazonium hexafluoroantimonate,
2,4-dinitrobenzenediazonium pentafluorostannate,
2,6-dichlorobenzenediazonium hexafluoroborate, and mixtures thereof. from those compounds that generate free-radicals upon exposure to actinic radiation, e.g., those compounds disclosed in Vesley, G. F., *J. Radiat. Curing* 1986, Jan., 4, and U.S. Pat. No. 4,747,432, which is incorporated herein by reference. Photoinitiators are selected from acetophenones and ketals, benzophenones, aryl glyoxalates, acylphosphine oxides, sulfonium and iodonium salts, diazonium salts and peroxides. Preferred additional free-radical initiators that are light activated are those that have an absorption maximum in the 300 to 400 nm region of the electromagnetic spectrum.

Especially useful are acetophenones and ketals corresponding to the formula:

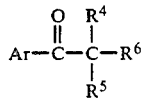

wherein Ar is a $C_6$-$C_{14}$ aryl group which is unsubstitued or substituted by halogen, CN, OH, or groups such as $C_1$-$C_{12}$ alkyl, $C_1$-$C_{12}$, alkoxy, phenoxy, $C_1$-$C_{12}$ thioalkyl, $SCH_2CH_2OH$, thiophenyl, $C_1$-$C_{12}$ : $SO_2$alkyl, $SO_2$phenyl, $C_2$-$C_{13}$ : COOalkyl, $SO_2,NH_2$, $C_1$ to $C_{12}$ $SO_2N$-Halkyl, $C_2$ to $C_{24}$ $SO_2N$(alkyl), $C_1$-$C_{12}$ NHalkyl, $C_2$-$C_{24}$ N(alkyl)$_2$, $C_2$-$C_{13}$ NHCOalkyl or NHCO-phenyl, or represents thienyl, pyridyl, furyl, indanyl or tetrahydronaphthyl, and preferably alkyl represents a lower alkyl radical of 1 to 4 carbon atoms;

$R^4$ can be OH, a $C_1$-$C_8$ alkyl group which is unsubstituted or substituted by -OH, alkoxy, $C_2$-$C_8$ acyloxy, -COOalkyl or CN, or is $C_2$-$C_4$ alkenyl, $C_5$-$C_6$ cycloalkyl, $C_7$-$C_9$ phenylalkyl, or -OR$^7$ wherein R$^7$ is $C_1$-$C_8$ alkyl which is unsubstituted or substituted by -OH, alkoxy, $C_2$-$C_8$ acyloxy, -COOalkyl, -CN or phenyl, or $C_6$aryl; and $R^5$ has one of the meanings assigned to $R^4$, a $C_2$-$C_8$ alkenylene group or together with $R^4$ represents a $C_2$-$C_8$ cycloalkylene group or a $C_3$-$C_9$ oxacycloalkylene group or azacycloalkylene group; and $R^6$ is hydrogen, OH, $C_1$-$C_8$ :alkyl group, $C_6$-$C_{14}$ aryl group, $C_5$-$C_8$ cycloalkyl group or morpholino group.

Such compounds have been disclosed, for example, in U.S. Pat. Nos. 3,715,293, 3,728,377, 4,284,485 and 4,318,791, all of which are incorporated herein by reference for these compounds.

Preferred compounds have $R^4$ and $R^5$ independently chosen from -OR$^8$, wherein $R^8$ can be $C_1$-$C_4$ alkyl group and $R^6$ can be a phenyl group; or $R^4$ and $R^5$ combining to form $C_2$-$C_8$ cycloalkylene group, preferably cyclohexylene group, and $R^6$ can be -OH or phenyl group.

Typical alkyl groups in $R^4$, $R^5$ and $R^6$ include methyl, ethyl, propyl, isobutyl, t-butyl, pentyl, neopentyl, hexyl, heptyl, octyl, 2-ethylhexyl; aryl groups include phenyl, naphthyl, anthracyl, tolyl, xylyl, methoxyphenyl, halophenyl, hydroxyphenyl, nitrophenyl and carboethoxyphenyl; and cycloalkyl groups include cyclopentyl, methylcyclopentyl, dimethylcyclopentyl, ethylcyclopentyl, cyclohexyl, methylcyclohexyl, cycloheptyl, bicycloheptyl, cyclooctyl, and bicyclooctyl. Illustrative acetophenones include:

2,2-dimethoxyacetophenone
2,2-dimethoxy-2-phenylacetophenone
2,2-diethoxyacetophenone
2,2-dibutoxyacetophenone
2,2-dihexyloxyacetophenone
2,2-di(2-ethylhexyloxy)acetophenone
2,2-diphenoxyacetophenone
2,2-ditolyloxyacetophenone
2,2-di(chlorophenyl)acetophenone
2,2-di(nitrophenyl)acetophenone
2,2-diphenoxy-2-phenylacetophenone
2,2-dimethoxy-2-methylacetophenone
2,2-dipropoxy-2-hexylacetophenone
2,2-diphenoxy-2-ethylacetophenone
2,2-dimethoxy-2-cyclopentylacetophenone
2,2-di(2-ethylhexyl)-2-cyclopentylacetophenone
2,2-diphenoxy-2-cyclopentylacetophenone
2,2-di(nitrophenoxy)-2-cyclohexylacetophenone
2,2-dimethyl-2-hydroxyacetophenone
2,2-diethoxy-2-phenylacetophenone
2,2-diphenethyloxy-2-phenylacetophenone
2,2-(2-butenediyloxy)-2-phenylacetophenone
2,2-dimethyl-2-morpholino-(pthiomethyl)
acetophenone
1-hydroxycyclohexyl phenyl ketone.

Also preferred are aromatic onium salts as free-radical photoinitiators. These salts are disclosed, for example in U.S. Pat. Nos. 4,069,054, 4,231,951 and 4,250,203. Such salts are described by the formula $$AW \quad\quad\quad IV$$

wherein A is an organic cation selected from those described in U.S. Pat. Nos. 3,708,296, 3,729,313, 3,741,769, 3,794,576, 3,808,006, 4,026,705, 4,058,401, 4,069,055, 4,101,513, 4,216,288, 4,394,403, and 4,623,676, which are incorporated herein by reference, preferably selected from diazonium, iodonium, and sulfonium cations, more preferably A is selected from diphenyliodonium, triphenylsulfonium and phenylthiophenyl diphenylsulfonium; and W is an anion where W preferably can be $CF_3SO_3,BF_4$, $PF_6,SbF_6{}^{31}$, $SbF_5OH$, $AsF_6{}^{31}$, and $SbCl^*$ $PF°$ Photoinitiators which are useful for partially polymerizing alkyl acrylate monomers without crosslinking, to prepare a partially polymerized syrup, discussed below, include the benzoin ethers (such as benzoin methyl ether or benzoin isopropyl ether), substituted benzoin ethers (such as anisoin methyl ether), substituted acetophenones (such as 2,2-diethoxyacetophenone and 2,2-dimethoxy-2phenylacetophenone), substituted alpha-ketols (such as 2-methyl-2-hydroxypropiophenone), aromatic sulfonyl chlorides (such as 2-naphthalenesulfonyl chloride) and photoactive oximes. Photoinitiators may be used for syrup-making in amounts which, when dissolved, are present in an amount of about 0.001 to 0.5 percent by weight of the alkyl acrylate monomer, preferably at least 0.01 percent.

A suitable photoinitiator system which includes organometallic complex ionic salts described above and a free-radical initiator contains those combinations that, upon application of two exposures of actinic radiation of $\lambda_1$ and $\lambda_2$ as defined above, provide a polymeric mixture having superior toughness. Preferably, each of $\lambda_1$ and $\lambda_2$ are in the range of 250 to 800 nm and preferably in the range of 300 to 600 nm of the electromagnetic spectrum, with the proviso that $\lambda_1$ and $\lambda_2$ differ from each other by at least 30 nm, preferably there is a difference in the range 30 to 700 nm, more preferably there is a difference in the range of 30 to 500 nm, and most preferably there is a difference in the range of 30 to 350 nm. Most preferably $\lambda_1$ is greater than $\lambda_2$. The level of catalytic activity depends on various factors such as the choice of metal, ligands, and counterions in the organometallic salt and selection of the free-radical photoinitiator.

By sequentially exposing the polymerizable compositions of this invention to actinic radiation according to the prescribed method described above, the polymeric precursor which is the minor component of the mixture (present in an amount in the range of 5 to 45 weight percent) is polymerized first without substantially polymerizing the major component. By "not substantially polymerizing" is meant that the polymerization of a component has occurred to an extent such that the gel point for that component has not been reached. Extent of conversion at the gel point can be calculated using the Flory-Stockmayer equation (Odian, G., *Principles of Polymerization*, 2nd Ed.; Wiley: NY, 1981; pp 112–119, equation 2-165): for polyurethane precursors, $$P_c = 1/\{r[1-p_{NCO}-2)][1=p_{OH}(f_{OH}-2)]\}^{\frac{1}{2}}$$

for free radically polymerizable monomers, $$P_c = 1/[1+p_X(f_X-2)]$$

wherein
  $P_c$ is the fractional conversion of monomer to polymer at the gel point,
  r is a ratio, always less than one, of the lesser of isocyanate reactive groups and isocyanate groups to the greater of isocyanate reactive groups and isocyanate groups,
  $p_{NCO}$ is the fraction of isocyanate groups belonging to isocyanate compounds bearing greater than two isocyanate groups,
  $p_{OH}$ is the fraction of isocyanate reactive groups belonging to compounds bearing greater than two isocyanate reactive groups,
  $p_X$ is the fraction of free radically polymerizable groups belonging to compounds bearing greater than one free radically polymerizable group,
  $f_{NCO}$, $f_{OH}$, and $f_X$ are the average functionality of compounds bearing greater than two isocyanate groups, greater than two isocyanate reactive groups, and greater than one free radically polymerizable group, respectively,
  wherein the functionality of each isocyanate group and each isocyanate reactive group is one, and the functionality of each free radically polymerizable group is two.

The sequential photoinitiation method as disclosed herein is particularly useful when the polyurethane precursor is not compatible with or soluble in the free-radically polymerizable monomer at room temperature. The process allows for heating the precursors to a temperature which will allow achieving compatibility or solubility without prematurely initiating cure. Subsequent sequential exposures to actinic radiation provide the desired cure.

In general, the photoinitiator system should be present in a catalytically effective amount. Typically, the photoinitiator system can be present in the range of 01 to 20, preferably 0.02 to 5 weight percent of the total polymerizable composition. The ratio of the organo complex salt (or other polyurethane initiator) to free-radical initiator is generally in the range of 1:100 by weight to 100:1 by weight. Preferably, the weight ratio is in the range of 1:10 and 10:1.

Energy polymerizable compositions of this invention are radiation-sensitive and additionally they can be polymerized in a two stage polymerization process wherein one or both radiations can be followed by heat. Heat can also be applied before or during the irradiation process to promote polymerization of the composition.

When desired, photosensitizers may be incorporated into the photopolymerizable compositions. Use of photosensitizers alters the wavelength sensitivity of radiation-sensitive compositions employing the latent photocatalysts and photoinitiators of this invention. This is particularly advantageous when the latent photocatalyst or photoinitiator does not strongly absorb the incident radiation. Use of a photosensitizer increases the radiation sensitivity, allowing shorter exposure times and/or use of less powerful sources of radiation. When cationic organometallic salts are used, any photosensitizer may be useful if its triplet energy is at least 45 kilocalories per mole. Examples of such photosensitizers are given in Table 2-1 of Murov, S. L., *Handbook of Photochemistry*; Marcel Dekker: NY, 1973; pp 27–35, and include pyrene, fluoranthrene, xanthone, thioxanthone, benzophenone, acetophenone, benzil, chrysene, p-terphenyl, acenaphthene, naphthalene, phenanthrene, biphenyl, substituted derivatives of the preceding compounds, and the like. When present, the amount of photosensitizer used in the practice of the present invention is generally in the range of 0.01 to 10 parts, and preferably 0.1 to 1.0 part, by weight, of photosensitizer per part of organometallic salt.

Long wavelength sensitizers may be added, i.e., dyes. Suitable sensitizers are believed to include compounds in the following categories of dyes: ketones, aminoketones, coumarins (e.g., ketocoumarins), xanthenes, acridines, thiazoles, thiazines, oxazines, azines, porphyrins, aromatic polycyclic hydrocarbons, aminotriaryl methanes, merocyanines, and squarylium and pyridinium salts.

Other useful materials which can be blended into compositions of the invention include, but are not limited to, adjuvants such as fillers, pigments, fibers, woven and nonwoven fabrics, foaming agents, antioxidants, stabilizers, fire retardants, free-radical inhibitors, and viscosity adjusting agents.

Where divided, the steps are preferably arranged in the following order. The first step is to mix the free-radically photopolymerizable monomer(s) containing a single polymerizable group with an effective amount of a free-radical initiator. Any bireactive monomers desired can be added during any step except that isocyanate-containing bireactive monomers preferably are added in the fourth step described infra. Preferably, this free-radical initiator does not also function as a crosslinking agent. The second step is to irradiate the composition, and allow it to polymerize so that the viscosity is increased. This will provide a partially polymerized syrup typically having a Brookfield viscosity of 300 to 20,000 centipoise at room temperature, preferably, from 500 to 2000 centipoise. The increased viscosity provides a syrup that is a more suitable coating composition. If a photoinitiator is used for this process, the partial polymerization may be stopped at any point simply by turning off the irradiation source. Alternatively, the syrup can be prepared by conventional thermal polymerization techniques and then quenched with air to attain the desired viscosity. Alternatively, the organometallic photoinitiator may be mixed with an alkyl acrylate monomer and then partially polymerized to form a syrup. The syrup can also be mixed with a viscosity adjusting agent, such as a hydrophilic silica to obtain a suitable viscosity for coating.

The third step is to mix the isocyanate reactive component into the syrup created in steps two and three.

The fourth step is to mix the syrup with isocyanate component.

The organometallic photoinitiator, crosslinking agent, and an additional amount of free-radical initiator may be added at any time after the step two irradiation. The photoinitiators may be mixed with any component. The finished modified syrup may be coated onto a backing and exposed to energy to complete the polymerization.

Alternatively, the composition may be made by mixing all monomers except the isocyanate with an effective amount of a free-radical initiator, partially polymerizing to increase viscosity, then adding the organometallic complex salt, crosslinking agent, additional free-radical photoinitiator, and the isocyanate, and following up by a sequential photoinitiation process.

In still an additional method, step one can be omitted, and all monomers and crosslinking agent can be mixed with a free radical photoinitiator and an organometallic photoinitiator, and following up by a sequential photoinitiation process.

Temperature of polymerization and amount of catalyst will vary depending on the particular photopolymerizable composition used and the desired application of the polymerized product. The amount of the total photoinitiator system to be used in this invention should be a catalytically-effective amount under the desired use conditions. As previously stated, such amount generally will be in the range of about 0.01 to 20 weight percent, and preferably 0.02 to 5 weight percent, based on the weight of curable composition.

Solvents, preferably organic, can be used to assist in dissolving of the photoinitiator system in the free-radically polymerizable monomers and polyurethane precursors and as a processing aid. It may be advantageous to prepare a concentrated solution of the organometallic complex salt in a solvent to simplify the preparation of the photopolymerizable composition. Representative solvents include organic solvents such as propylene carbonate, acetone, methyl ethyl ketone, cyclopentanone, methyl cellosolve acetate, methylene chloride, nitromethane, methyl formate, acetonitrile, gammabutyrolactone, and 1,2-dimethoxyethane (glyme). In some applications, it may be advantageous to adsorb the photoinitiator onto an inert support such as silica, alumina, clays, etc., as described in U.S. Pat. No. 4,677,137, incorporated herein by reference.

Compositions containing an organometallic complex salt and a free-radical photoinitiator may be photopolymerized by exposure to any source of radiation, particularly radiation sources emitting radiation in the ultraviolet and visible region of the spectrum (e.g., about 200 to 800 nm). Suitable sources of radiation include mercury vapor discharge lamps, carbon arcs, tungsten lamps, xenon lamps, lasers, sunlight, and the like. The required amount of exposure to effect polymerization is dependent upon such factors as the identity and concentrations of the organometallic complex salt and free-radical photoinitiator; the specific free-radically polymerizable monomers and the polyurethane precursors, thickness of the exposed material which can be e.g., 0.04 mm to 25 cm, intensity of the radiation source and amount of heat associated with the radiation.

For the multiple photoinitiation process, light centered around two different wavelengths is employed in combination with a set of (at least two) photoinitiators. These photoinitiators frequently have absorption maxima at differing wavelengths. In such case, use of actinic radiation having substantially different wavelengths will generally be required. This increased control over the order of polymerzzation provides a consonent increase in the ability to control the final properties of the composition. Such radiation can be provided in a number of ways. Different radiation sources of substantially different wavelengths can be used. The wavelengths of major intensity for each source can be obtained from examination of the spectral output of each source. One source could be used for different wavelength regions through use of filters or monochromators. Lasers or other monochromatic light sources are also useful. For example, a tungsten lamp, whose output is mainly in the visible region, could be used as one light source while a lamp whose output is concentrated around 360 nm, e.g., a black light, could be used as another source.

Thermal means using direct heating or infrared electromagnetic radiation, as it is known in the art, can be used to aid in polymerizing the free-radically polymerizable monomers and the polyurethane precursors according to the teachings of this invention. It is also possible to use microwave irradiation to provide thermal energy to aid in polymerizing the compositions of this invention.

It is within the scope of this invention to use multiple wavelengths of actinic radiation by irradiating the photopolymerizable compositions sequentially. In the preferred method, photopolymerization is effected by sequential exposure to a radiation source emitting active radiation in the visible region of the spectrum, followed by exposure to a radiation source in the ultraviolet region of the spectrum. It is also preferred to heat either during or after irradiation in the visible region. In addition, it may be desirable to subsequently thermally polymerize the activated precursor so obtained, the irradiation temperatures being below the temperature employed for subsequent heat postcuring. These activated precursors may normally be polymerized at temperatures which are substantially lower than those required for direct thermal polymerization, with an advantage in the range from 50° C to 110° C. This process also makes it possible to control polymerization in a particularly simple and advantageous manner.

In the current state of the art, free-radical photopolymerization preferably is carried out in an inert atmosphere. Any inert atmosphere such as nitrogen, carbon dioxide, helium or argon is suitable. A sufficiently inert atmosphere can be achieved by covering a layer of the photoactive mixture with a plastic film which is transparent to ultraviolet radiation and irradiating through that film in air. The composition should be kept in low light, or preferably total darkness, in air, vacuum, or inert gaseous atmosphere until ready for photopolymerization.

The present invention composition has utility as a vibration damping material. Properties of vibration-damping materials are described in the literature. Nielsen, L.E., *Mechanical Properties of Polymers*, Van Nostrand Reinhold: New York, 1965; pp 162-165, discloses that materials possessing the maximum vibration-damping capability have shear storage moduli, G', greater than $10^7$ dynes/cm$^2$ but less than $10^{10}$ dynes/cm$^2$ at the use temperature. Furthermore, Rosen, S L., *Functional Principles of Polymeric Materials for Practicing Engineers*; Barnes and Noble: New York, 1971; pp 222-227, shows that it is desirable for a vibration-damping material to have both a storage modulus and a loss tangent with values as high as possible.

Yerges, L.F., *Sound, Noise, and Vibration Control*; Van Nostrand Reinhold: New York, 1965; pp 68-69, notes that useful damping materials exhibit decay rates from as low as 5 to 80 dB/sec (decibels/second), and from ½ to 20 percent of critical damping. ("Critical" damping is the damping necessary to just prevent oscillation).

Damping materials are applied to structures and component parts in devices to attenuate resonant vibrations and thereby reduce noise and vibrational fatigue. This is often accomplished by attaching a viscoelastic material of appropriate damping characteristics to the vibrating structure. The vibrational forces cause the viscoelastic material to undergo deformation where some of its inelastic deformation energy is converted to heat and then dissipated (mechanical hysteresis). Under cyclic loading, the heat generated results in a temperature rise until the heat generated per cycle is equal to the heat dissipated through conduction, convection and radiation. Thus, the ability of a material to damp is measured by its ability to convert vibrational energy to heat energy.

In viscoelastic materials, the maximum amount of energy is dissipated as heat at the glass-rubber transition temperature. The effectiveness of a viscoelastic material in energy dissipation is evaluated by measuring its viscoelastic response to a periodic stress or strain. Results of the dynamic mechanical test are generally given in terms of the storage modulus, E, or G', and the loss modulus, E" or G". E is Young's modulus and G is the shear modulus. E" (or G") is the damping or energy dissipation term. The angle which reflects the time lag between the applied strain and stress is known as $\delta$, and is defined by the ratio called the dissipation factor or loss factor. Tan ($\delta$) is a damping term and is a measure of the ratio of energy dissipated as heat to the maximum energy stored in the material during one cycle of osscillation; Tan $(\delta) = G''/G'$ (or $E''/E'$).

As is known in the art, the most efficient use of the damping material occurs if the material is sandwiched between the panel to be damped and a relatively stiff layer, such as a thin metal sheet. This forces the damping material into shear as the panel vibrates, dissipating substantially more energy than when the material acts simply in extension and compression.

Solid articles comprising the viscoelastic polymeric mixtures of the invention are prepared by either of two processes. In a first process, a layer of the polymerizable mixture is coated onto a release liner, the mixture polymerized, and the layer of resulting polymeric mixtures transferred to a substrate and adhered thereto, thereby providing a constrained-layer construction. In the second process, a layer of the polymerizable mixture is coated directly onto a substrate and the mixture polymerized in situ thereby also providing a constrained-layer construction. The constrained-layer construction is then mechanically (e.g., as by bolting) or adhesively affixed to the solid article that requires vibration damping. When the solid article subsequently vibrates under the influence of an internal or external applied force, vibration in the solid article is damped.

Since the viscoelastic polymer often has adhesive properties, the polymer can usually be adhered to a stiff layer or substrate without the use of an adhesive. It is sometimes desirable, however, to use a thin layer (e.g., 20-50 μm) of high-modulus adhesive, such as an acrylic adhesive or an epoxy adhesive, to bond the polymer to a solid article which can be, for example, an oil pan, a valve cover, or a transmission housing.

For most applications, the layer of viscoelastic polymer is a coating having a thickness of at least 0.01 mm up to about 100 mm, preferably 0.025 to 100 mm, and most preferably 0.05 to 100 mm. The coating can be applied by any of the techniques known in the art such as by spray, dip, knife, or curtain coating.

As mentioned above, a stiff layer or substrate is an essential part of the constrained-layer vibration-damping constructions of the present invention. A suitable material for a substrate has a stiffness of at least 0.40 (relative to stainless steel) as defined in *Handbook of Tables for Applied Engineering Science*, Bolz, R.E. et al., eds., CRC Press: Cleveland, Ohio, 1974, p 130. The desired stiffness of the substrate is varied by adjusting the thickness of the layer, for example from about 25 micrometers to 5 centimeters, depending on the modulus of the substrate. Examples of suitable materials include metals such as iron, steel, nickel, aluminum, chromium, cobalt and copper, and alloys thereof and stiff polymeric materials such as polystyrene, polyvinylchloride, polyurethane, polycarbonate, and polyepoxide, glass fiber-reinforced plastics such as glass fiber, ceramic fiber, and metal fiber-reinforced polyester, glasses, and ceramics. The process for polymerization of the composition may be completed in one step, or may be divided into several steps separated by an interval of time, where such is preferable.

The tough polymeric mixtures of the invention provide impact resistant protective coatings on a variety of substrates, such as glass, metal, wood, ceramics, paper, and polymers. The coating can be stripped from a support bearing a release layer to provide a selfsupported film. Release layers are well-known in the art.

Objects and advantages of this invention are further illustrated by the following examples, but they should not be construed as limiting the invention; the scope of which is defined by the claims.

EXAMPLE 1

In a glass jar was placed 80 parts of isooctyl acrylate mixed with 20 parts of N-vinylpyrrolidone. 85 parts of this mixture was mixed with 0.04 parts Irgacure ™ 651 (a free radical initiator, 2,2-dimethoxy-2-phenylacetophenone Ciba-Geigy Corp., Ardsley, NY). The mixture was continuously stirred using a magnetic stirrer and deoxygenated by bubbling nitrogen gas through the solution for at least 5 minutes. The mixture was then exposed to radiation from two Blacklight ™ blue lamps (Sylvania, Eagan, MN, no. F15T8/BLD) for about 45 seconds resulting in about 10% acrylate conversion corresponding to a viscosity of about 1500 centipoise (Prepolymer A).

To this prepolymer was added 15 parts of hydroxyethylated bisphenol of fluorenone. The mixture was then heated on a water bath to about 80–90° C. to dissolve the diol. An additional 0.1 part of Irgacure ™ 651 was added along with 0.03 part of inorganic photocatalyst, (eta$^6$-xylene)(eta$^5$-cyclopentadienyl)iron(1+) hexafluorophosphate, 0.1 part of hexanediol diacrylate, and 12.33 parts of an isocyanate mixture containing a 1:1 weight ratio of Desmodur ™ N100 (Mobay Corp., Pittsburgh, PA) and isophorone diisocyanate. The jar was capped and shaken to achieve thorough mixing. The hot mixture was then degassed under vacuum to remove air bubbles and dissolved oxygen.

The mixture was coated using a knife edge coater. The coater was heated with infrared lamps just prior to coating. The mixture was coated between two liners of 15.2 cm (6 inch) wide polyester films. The films were coated with a release liner to allow the cured adhesive to be removed. The coater was divided into three zones. Zone 1 consisted of four 300 watt flood lamps. Two lamps were suspended over the web and two lamps were placed under the web. The lamps were placed about 5.1 cm (two inches) from the web. Zone 2 consisted of a UV irradiation zone. UV exposure was 600 mJ/cm$^2$ as measured by an EIT Light Bug (Electronic Instrumentation and Technology, Inc., Sterling, VA). The web speed was 45 cm (1.5 feet) per minute. The sample was post-cured in Zone for 30 minutes at 100° C. followed by 30 minutes at 125° C. to provide a tough film. The film was easily removed from the liners to provide a self-supporting tough film.

COMPARATIVE EXAMPLE A

Comparative Example A was formulated and processed exactly as Example 1 and processed using UV light only in a single photostage cure. The sample was not exposed to radiation from the visible lamps. Toughness, modulus, and tensile data are given in TABLE 1, below.

EXAMPLE 2

To 85 parts Prepolymer A prepared as in Example 1 was added 15 parts Desmophen ™ 670-80 polyester polyol (Mobay Corp., Pittsburgh, PA). The mixture was then heated on a water bath to about 80–90° C. to dissolve the polyol, then allowed to cool. An additional 0.1 parts Irgacure ™ 651 was added along with 0.03 parts (eta$^6$xylene) (eta$^5$-cyclopentadienyl)iron(1+) hexafluorophosphate, 0.1 parts of hexanediol diacrylate and 1.42 parts of an isocyanate mixture containing a 1:1 weight ratio of Desmodur ™ N100 and isophorone diisocyanate. The jar was capped and shaken to achieve thorough mixing. The mixture was then degassed under vacuum to remove air bubbles and dissolved oxygen.

The mixture was coated and irradiated as in Example 1. The sample was post cured in Zone 3 for 30 minutes at 100° C. to provide a self-supporting tough film.

COMPARATIVE EXAMPLE B

Comparative Example B was formulated and processed exactly as Example 2. The processing utilized UV light only in a single photostage cure. Toughness, modulus, and tensile strength data is given in TABLE 1, below. The sample was not exposed to radiation from the visible lamps.

Examples 1 and 2 and Comparative Examples A and B were evaluated for toughness, Young's modulus and tensile strength according to ASTM standard D 638-89 using an Instron ™ model 1122 testing machine. Specimens were prepared using a type IV die as discussed in ASTM D 638-89. The crosshead speed was 508 mm/min. "Toughness" is defined as the energy required to break a test specimen, and was derived from stress-strain curves by computing the area under (i.e., integration of) the curve. All toughness values are given for specimens with a cross sectional area of 6.4 mm:

TABLE 1

| Example number | Toughness (N-mm) | Young's modulus (MPa) | Tensile strength (MPa) |
|---|---|---|---|
| 1 | 76200 | 1.81 | 5.14 |
| A (comparative) | 62100 | 1.41 | 4.55 |
| 2 | 656 | 0.039 | 0.63 |
| B (comparative) | 386 | 0.036 | 0.42 |

Data of TABLE 1 show that films cured by the sequential photoinitiation process of the invention have superior toughness, modulus, and tensile strength compared to identical formulations cured by a conventional single photostage curing process. Sample 1 shows greater than 20% improvement in toughness compared to A and Sample 2 shows greater than 50% improvement (i.e., 70%) in toughness compared to B.

The following five examples (this includes 2 comparative examples) demonstrate the general utility of the invention to produce vibration damping materials as self-supporting members. A series of coatable compositions were prepared using the following procedure.

EXAMPLE 3

In glass jar were mixed 65 parts isooctyl acrylate and 35 parts N-vinylpyrrolidone. 50 parts of this mixture was mixed with 0.02 parts Irgacure ™ 651 The mixture was continuously stirred using a magnetic stirrer and deoxygenated by bubbling nitrogen gas through the solution for at least 5 minutes. The mixture was then exposed to radiation from two Blacklight ™ blue lamps for about 45 seconds. The reaction was allowed to go to about 10% acrylate conversion. This corresponded to a viscosity of about 1500 centipoise. To this prepolymer was added 7.5 parts of hydroxyethylated bisphenol of fluorenone. An additional 0.05 parts of Irgacure:" 651 was added along with 0.03 parts (eta$^6$-xylene)(eta$^5$-cyclopentadienyl)iron (1+) hexafluorophosphate, and 0.05 parts hexanediol diacrylate. To this mixture was added 5.42 parts of an isocyanate mixture containing a 1:1 weight ratio of Desmodur N100 and isophorone diisocyanate. The jar was capped and shaken to achieve thorough mixing. The mixture was then degassed under vacuum to remove air bubbles and dissolved oxygen.

The mixture was coated and irradiated as described in Example 1, then post-cured for 45 minutes at 100° C. followed by 15 minutes at 125° C. The cured composition was removed from the liners.

EXAMPLE 4

Another sample was prepared according to the procedure described in Example 3, except that 4.02 parts of an isocyanate mixture containing a 1:99 weight ratio of Desmodur TM N100 and isophorone diisocyanate was substituted for the 5.42 parts mixture of Desmodur TM N 100 and isophorone diisocyanate in the formulation.

EXAMPLE 5

Prepolymerization was carried out in a glass jar; 35 parts of isooctylacrylate, 35 parts of isobornyl acrylate, 35 parts of N-vinylpyrrolidone were mixed with 0.04 parts of free radical initiator, Irgacure TM 651 The mixture was continuously stirred using a magnetic stirrer and deoxygenated by bubbling nitrogen gas through the solution for at least 5 minutes. The mixture was then exposed to radiation from two Blacklight TM blue lamps for about 45 seconds resulting in about 10% acrylate conversion corresponding to a viscosity of about 1500 centipoise. To this prepolymer was added 50 parts of hydroxyethylated bisphenol of fluorenone. The mixture was then heated on a water bath to about 80° C. to dissolve the diol. An additional 0.1 part of Irgacure TM 651 was added along with 0.17 part of an inorganic photocatalyst, (eta$^6$-xylene)(eta$^5$-cyclopentdienyl-)iron(1+) hexafluoro(eta phosphate, 0.1 parts of hexanediol diacrylate and 18.07 parts of an isocyanate mixture containing a 1:1 weight ratio of Desmodur TM N100 and isophorone diisocyanate. The jar was capped and shaken to achieve thorough mixing. The mixture was then degassed under vacuum to remove air bubbles and dissolved oxygen.

The mixture was coated and irradiated as in Example 1. Subsequently, it was post-cured for 45 minutes at 100° C followed by 15 minutes at 125° C, and then removed from the liners.

COMPARATIVE EXAMPLE C

Comparative Example C was the exact same formula as Example 3. The processing conditions were the same as Example 3 except that the sample was not irradiated in Zone 1 (no visible light exposure). This sample was exposed to UV irradiation only in Zone 2 (single photostage cure).

COMPARATIVE EXAMPLE D

Comparative Example D was the exact same formula as Example 4. The processing conditions were the same as Example 4 except that the sample was not irradiated in Zone 1 (no visible light exposure). This sample was exposed to UV irradiation only in Zone 2 (single photostage cure).

Examples 3, 4, and 5 displayed good damping characteristics as determined by dynamic mechanical analysis on a Rheometrics Solids Analyzer RSA II (Rheometrics, Inc., Piscataway, NJ. These materials exhibited a Young's storage modulus (E,) of about $1 \times 10^{10}$ dynes/cm$^2$ in the glassy region and about $10^7$ dynes/cm$^2$ in the rubbery plateau as determined from a dynamic tensile test performed at 1 Hertz. These values translated to a shear storage modulus (G') of about $3.8 \times 10^9$ dynes/cm$^2$ in the glassy regime and $3.8 \times 10^6$ dynes/cm$^2$ in the rubbery plateau via the well known relationship of $E = 2(1+v)G$ where v is Poisson's ratio which varies between 0 and 0.5. Since v is generally between 0.3 and 0.35 for plastics, $E = 2.65G$ is a good approximation.

Damping behavior as delineated via Tan ($\delta$) was determined from dynamic mechanical experiments performed using a shear sandwich geometry and a test frequency of 1 Hertz. The temperature range for damping (useful damping materials have a Tan($\delta$)$\geq$0.6) was from about 43° C. to about 140° C. for Examples 3 to 5. Peak maximum of Tan($\delta$), the temperature at which Tan($\delta$) is a maximum, and the temperature interval at Tan($\delta$) >0.6 and are shown in Table 2. Examples of the invention exhibit good damping characteristics, and are suitable as the viscoelastic component in both free-layer and constrained-layer damping constructions.

TABLE 2

| Example | Tan ($\delta$) amplitude (maximum) | Temp interval at tan ($\delta$) $\geq$ 0.6 (°C.) |
|---|---|---|
| 3 | 0.89 | 73 (maximum at 100) |
| C (comparative) | 0.95 | 31 (maximum at 48) |
| 4 | 1.04 | 31 (maximum at 55.5) |
| D (comparative) | 1.00 | 28 (maximum at 64) |
| 5 | 1.36 | 42 (maximum at 110) |

Data of TABLE 2 show that samples of the invention (Examples 3, 4, 5) provide a wider temperature range for good damping properties than comparative sample prepared using a single photostage curing process.

EXAMPLES 6 to 10

Data of the following examples are given in TABLE 4 and show utility of the invention to produce tough, impact resistant protective coatings.

Tetrahydrofurfuryl acrylate(SR285) (Sartomer Company, West Chester, PA) was mixed with tetraethyleneglycol diacrylate, ($SR268) (Sartomer Company) in various ratios as shown in Table 3. Acrylate mixture (80 parts) was combined with 10.9 parts Desmophen 670–100 and 3.8 parts of an isocyanate mixture containing a 1:1 weight ratio of Desmodur TM N-100 and isophorone diisocyanate. Irgacure TM 651 (0.05 parts) was added along with 0.025 part of organometallic photocatalyst, (eta$^6$-xylene)(eta$^5$-cyclopentdienyl)iron(1+) hexafluorophosphate.

The solutions were coated on aluminum panels using a #10 wire wound bar (R.D. Specialties, Webster, NY). The coated panels were then exposed to irradiation from flood lamps placed above and below the panel. The web speed was 30 cm (1 foot) per minute. The panels were then placed in an oven at 70° C. for 5 minutes. The panels were then put through three passes in a UV processor (RPC Equipment UV Processor, Model QC. 1202 TM, PPG Industries, 20 Plainfield, IL, under nitrogen atmosphere at 15 m/min. (50 ft/minute). The UV exposure was 1.8 joules/cm$^2$. The coated panels were then post-cured in an oven for 1 hour at 100° C. prior to testing.

The coated samples were tested for gloss and reverse impact strength. Gloss was measured using a Gardner #4525 Gloss Meter (BYK Gardner, Silver Spring, MD). High gloss measurements are desirable in coatings. Gloss is correlated with smooth surfaces and clarity of coating. Reverse impact tests were performed according to ASTM standard D3029-84. The impact tests employed measure impact resistance or toughness. Crosshatch adhesion tests (to aluminum panels) was measured according to ASTM standard D 3359-78. Data are shown in TABLES 3 and 4.

TABLE 3

Acrylate Solution Composition (Parts by Weight)

| Example number | SR285 | SR268 |
| --- | --- | --- |
| 6 & E | 29 | 71 |
| 7 & F | 43 | 57 |
| 8 & G | 57 | 43 |
| 9 & H | 71 | 29 |
| 10 & I | 86 | 14 |

TABLE 4

| Example number | Gloss % at 20° | Gloss % % at 60° | Impact (N-m) at 60° | Impact (N-m) at 23° | Cross-hatch adhesion |
| --- | --- | --- | --- | --- | --- |
| 6 | 99.5 | 100+ | 108 | 108 | 3 |
| E | 97.6 | 100+ | 81 | 14 | 0 |
| 7 | 100+ | 100+ | 135 | 95 | 3 |
| F | 7.0 | 15.4 | 81 | 68 | 2 |
| 8 | 100+ | 100+ | 189 | 122 | 5 |
| G | 3.4 | 6.5 | 122 | 135 | 3 |
| 9 | 100+ | 100+ | 203+ | 203+ | 5 |
| H | 2.2 | 4.5 | 149 | 162 | 5 |
| 10 | 100+ | 100+ | 203+ | 203+ | 5 |
| I | 2.0 | 4.3 | 203+ | 203+ | 5 |

The data of TABLE 4 show that the samples of the invention have higher gloss in all cases (aesthetic appeal for protective coatings) while maintaining equal or greater impact resistance and cross-hatch adhesion to aluminum compared to the same compositions cured in a single photostage process.

Various modifications and alterations of this invention will become apparent to those skilled in the art without departing from the scope and spirit of this invention, and it should be understood that this invention is not to be unduly limited to the illustrative embodiments set forth herein.

We claim:

1. A process for preparing a tough polymeric mixture comprising the steps of:

a) providing admixture I or II
wherein
admixture I comprises 5 to 45 weight percent of a first monomer and a photoinitiator therefor, said first monomer being at least one free-radically polymerizable monomer, and 95 to 55 weight percent of a second monomer and a photoinitiator therefor, said second monomer being at least one set of polyurethane precursors selected from the group consisting of one or more diisocyanates and polyisocyanates, and one or more monomers bearing at least two isocyanate-reactive groups, and admixture II comprises 5 to 45 weight percent of a first monomer and a photoinitiator therefor, said first monomer being at least one set of polyurethane precursors as defined above, and 95 to 55 weight percent of a second monomer and a photoinitiatro therfor, said second monmer being at least one free-radically polymerizable monomer, and b) exposing sequentially said admixture I or II to first and second actinic radiations of wavelength ranges centered around $\lambda_1$ and $\lambda_2$, respectively, wherein said first actinic radiation activates said photoinitiatro of said first monomer without substantially activating said photoinitiator for said second monomer, and wherein said second actinic radiation activates said photoinitiator for said second monomer, and wherein $\lambda_1$ and $\lambda_2$ differ from each other by at least 30 nm, and wherein the monomer present in lesser amount is exposed to said first actinic radiation centered around $\lambda_1$ and wherein said monomer present in greater amount is exposed to said second and subsequent actinic radiation centered around $\lambda_2$, wherein the actinic radiation centered around $\lambda_1$ does not substantially polymerize the second monomer, and wherein the area under a stress-strain curve as determined by ASTM D638-89 for said polymeric mixture is at least 10 percent greater when said precursor monomers are cured by said sequential photoinitiation process compared to that are for the mixture when cured by a single photostage curing process.

2. The method according to claim 1 wherein admixture I and admixture II further comprise an effective amount of at least one crosslinking agent.

3. The method according to claim 1 wherein at least one of $\lambda_1$ and $\lambda_2$ is in the visible region of the spectrum.

4. The method according to claim 1 wherein at least one of $\lambda_1$ and $\lambda_2$ is in the ultraviolet region of the spectrum.

5. The method according to claim 1 wherein at least one of said actinic radiation exposures is preceded by, is simultaneous with, or is followed by heating the mixture.

6. The method according to claim 1 wherein said first monomer is precured sufficiently to provide a coatable syrup.

7. The process according to claim 1 wherein said polyurethane precursors of admixture I are present in the range of 90 to 60 weight percent and said free radically polymerizable monomers are present in the range of 10 to 40 weight percent of the total composition.

8. The process according to claim 1 wherein said free-radically polymerizable monomers of admixture II are present in the range of 90 to 60 weight percent and said polyurethane precursors are present in the range of 10 to 40 weight percent of the total composition.

9. The process according to claim 1 wherein said free-radically polymerizable monomer of admixture I or II is selected from the group consisting of acrylate, methacrylate, and vinyl ester functionalized materials.

10. The process according to claim 1 wherein said polyurethane precursors of admixture I or II are an aliphatic polyisocyanate and a polyol.

11. The process according to claim 1 wherein said photoinitiator for said polyurethane precursors of admixture I or II is selected from the group consisting of diazonium salts and salts of transition metal-containing organometallic complex cations.

12. The process according to claim 2 wherein said transition metal-containing organometallic complex cation contains iron.

13. The process according to claim 1 wherein said free-radical photoinitiator for admixture I or II is selected from the group consisting of acetophenones, ketals, benzophenones, benzion ethers, triazines, arylglyoxalates, acylphosphine oxides, sulfonium salts, iodonium salts, diazonium salts, and peroxides.

14. The process according to claim 1 wherein said free-radical photoinitiator for admixture I or II is selected from the group consisting of acetophenones and benzoin ethers.

15. The process according to claim 1 wherein said total photoinitiator system for admixture I or II is present in the range of 0.01 to 20 weight percent of the total polymerizable composition.

16. The process according to claim 1 wherein said polyurethane initiator to free-radical initiator for admixture I or II is present in the range of 1:100 to 100:1 by weight.

17. The process according to claim 1 further comprising at least one photosensitizer.

18. The process according to claim 1 wherein the area under said stress-strain curve is at least 20 percent greater compared to a stress-strain curve for the same mixture when cured by a single photostage curing process.

19. The process according to claim 1 wherein the area under said stress-strain curve is at least 50 percent greater compared to a stress-strain curve for the same mixture when cured by a single photostage curing process.

20. The process according to claim 1 wherein said free-radical photoinitiator is 2,2-dimethoxy-2-phenylacetophenone and said photoinitiator for said polyurethane precursors is $(\eta^6$-xylene$)(\eta^5$-cyclopentadienyl$)$iron$(1+)$ hexafluorophosphate.

* * * * *

UNITED STATES PATENT AND TRADEMARK OFFICE
CERTIFICATE OF CORRECTION

PATENT NO. : 5,102,924

DATED : April 7, 1992

INVENTOR(S) : Jerry W. Williams et al.

It is certified that error appears in the above-identified patent and that said Letters Patent is hereby corrected as shown below:

Title page, item [57]:

In the Abstract, 19th line, "wavelengths" should read -- wavelength --.

In the Abstract, 22nd line, after "centered" insert -- around --.

In the Abstract, 23rd line, "substantialy" should read -- substantially --.

Col. 1, line 61, "ethylenicallyunsaturated" should read -- ethylenically-unsaturated --.

Col. 4, line 27, "isocyanatereactive" should read -- isocyanate-reactive --.

Col. 5, line 1, "polymerizablemmonomer(s)" should read -- polymerizable monomer(s) --.

Col. 5, line 36, "acrlloxy" should read -- acryloxy --.

Col. 6, line 18, "tetraarrylate" should read -- tetraacrylate --.

Col. 6, line 52, "1,4tetramethylene" should read -- 1,4-tetramethylene --.

Col. 7, line 2, "triphenylmethane-4,4',4,4'4"-triisocyanate" should read -- triphenylmethane-4,4',4"-triisocyanate --.

Col. 7, line 25, "t-butyl" should read -- $\underline{t}$-butyl --.

UNITED STATES PATENT AND TRADEMARK OFFICE
CERTIFICATE OF CORRECTION

PATENT NO. : 5,102,924
DATED : April 7, 1992
INVENTOR(S) : Jerry W. Williams et al.

It is certified that error appears in the above-identified patent and that said Letters Patent is hereby corrected as shown below:

Col. 7, line 44, "ahd" should read -- and --.

Col. 8, line 67, "2,5hexanediol" should read -- 2,5-hexanediol --.

Col. 10, line 20, after "ASF$_6^-$," insert -- SbF$_6^-$, FeCl$_4^-$, SnCl$_5^-$, SbF$_5^-$, AlF$_6^-$, GaCl$_4^-$, InF$_4^-$, TiF$_6^-$, --.

Col. 10, line 21, delete "SO:".

Col. 10, line 27, "[(L$^5$)(L$^6$)M]$^+\cdot$X$_f$" should read -- [(L$^5$)(L$^6$)M]$^{+e}$X$_f$ --.

Col. 10, lines 51-52, "hexa-fluoroantimonate" should read -- hexafluorophosphate --.

Col. 10, line 53, before "(eta$^6$-naphthalene)(eta$^5$cyclopentadienyl)iron(1+) hexafluoroantimonate" insert -- (eta$^6$-hexamethylbenzene)(eta$^5$-cyclopentadienyl)iron(1+) hexafluoroantimonate --.

UNITED STATES PATENT AND TRADEMARK OFFICE
CERTIFICATE OF CORRECTION

PATENT NO. : 5,102,924
DATED : April 7, 1992
INVENTOR(S) : Jerry W. Williams et al.

It is certified that error appears in the above-identified patent and that said Letters Patent is hereby corrected as shown below:

Col. 10, line 53, "($eta^6$-naphthalene)-($eta^5$cyclopentadienyl)iron(1+)-hexafluoroantimonate" should read -- ($eta^6$-naphthalene)-($eta^5$-cyclopentadienyl)-iron(1+)hexafluoroantimonate --.

Col. 11, line 20, after "thereof" begin a new paragraph -- The free-radical photoinitiator can be selected --.

Col. 11, line 42, "$C_1-C_{12}$, alkoxy" should read -- $C_1-C_{12}$ alkoxy --.

Col. 11, line 43, "$C_1-C_{12}$:$SO_2$ alkyl" should read -- $C_1-C_{12}$ $SO_2$alkyl --.

Col. 11, line 44, "$C_2-C_{13}$: COOalkyl" should read -- $C_2-C_{13}$ COOalkyl --.

Col. 11, line 44, "$SO_2,NH_2$" should read -- $SO_2NH_2$ --.

Col. 11, line 45, "$SO_2N(alkyl)$" should read -- $SO_2N(alkyl)_2$ --.

Col. 11, line 61, "$C_1-C_8$:alkyl group" should read -- $C_1-C_8$alkyl group --.

Col. 12, line 37, "2,2-dimethyl-2-morpholino-(pthiomethyl)" should read -- 2,2-dimethyl-2-morpholino-(p-thiomethyl) --.

UNITED STATES PATENT AND TRADEMARK OFFICE
CERTIFICATE OF CORRECTION

PATENT NO. : 5,102,924
DATED : April 7, 1992
INVENTOR(S) : Jerry W. Williams et al.

It is certified that error appears in the above-identified patent and that said Letters Patent is hereby corrected as shown below:

Col. 12, lines 56-57, "$CF_3SO_3$, $BF_4$, $PF_6$, $SbF_6^{31}$, $SbF_5OH$, $AsF_6^{31}$, and $SbCl°PF°$" should read -- $CF_3SO_3^-$, $BF_4^-$, $PF_6^-$, $SbF_6^-$, $SbF_5OH^-$, $AsF_6^-$, and $SbCl_6^-$ --.

Col. 12, line 65, "2,2-dimethoxy-2phenylacetophenone" should read -- 2,2-dimethoxy-2-phenylacetophenone --.

Col. 13, line 38, delete the formula as printed and insert:

-- $P_c = 1/\{r[1-\rho_{NCO}(f_{NCO} - 2)][1 + \rho_{OH}(f_{OH} - 2)]\}^{1/2}$ --.

Col. 14, line 9, "01" should read -- 0.01 --.

Col. 14, line 11, "organo" should read -- organometallic --.

Col. 15, line 63-64, "gammabutyrolactone" should read -- gamma-butyrolactone --.

Col. 16, line 24, "polymerzzation" should read -- polymerization --.

Col. 17, line 50, "E," should read -- E' --.

Col. 18, line 54, "selfsupported" should read -- self-supported --.

Col. 19, line 32, "$terling" should read -- Sterling --.

UNITED STATES PATENT AND TRADEMARK OFFICE
CERTIFICATE OF CORRECTION

PATENT NO. : 5,102,924
DATED : April 7, 1992
INVENTOR(S) : Jerry W. Williams et al.

It is certified that error appears in the above-identified patent and that said Letters Patent is hereby corrected as shown below:

Col. 19, line 34, after "Zone" insert -- 3 --.

Col. 19, line 54, "(eta$^6$xylene) should read -- (eta$^6$-xylene) --.

Col. 20, line 16, delete "TABLE 1" (first occurrence).

Col. 20, line 44, "N-vinylpyrrolidone" should read -- $\underline{N}$-vinylpyrrolidone --.

Col. 20, line 45, after "Irgacure™ 651" insert -- . --.

Col. 20, line 56, "Irgacure:" 651" should read -- Irgacure™ 651 --.

Col. 20, line 61, "Desmodur N100" should read -- Desmodur™ N100 --.

Col. 21, line 14, after "Irgacure™ 651" insert -- . --.

Col. 21, line 27, "hexafluoro(eta phosphate," should read -- hexafluorophosphate, --.

Col. 21, line 58, "(E,)" should read -- (E') --.

Col. 22, line 9, "Tan ($\delta$) > 0.6" should read -- Tan ($\delta$) $\geq$ 0.6 --.

Col. 22, line 35, "$R268" should read -- SR268 --.

UNITED STATES PATENT AND TRADEMARK OFFICE
CERTIFICATE OF CORRECTION

PATENT NO. : 5,102,924
DATED : April 7, 1992
INVENTOR(S) : Jerry W. Williams et al.

It is certified that error appears in the above-identified patent and that said Letters Patent is hereby corrected as shown below:

Col. 22, line 37, "Desmophen" should read -- Desmophen™ --.

Col. 22, line 52, "Model QC. 1202™" should read -- Model QC 1202™ --.

Col. 22, line 53, delete "20".

Col. 23, line 59 (claim 1), "photoinitiatro therfor" should read -- photoinitiator therefor --.

Col. 23, line 59 (claim 1), "monmer" should read -- monomer --.

Col. 23, lines 65-66, "photoinitiatro" should read -- photoinitiator --.

Col. 24, line 1, "photinitiator" should read -- photoinitiator --.

Col. 24, line 17, "are" should read -- area --.

UNITED STATES PATENT AND TRADEMARK OFFICE
CERTIFICATE OF CORRECTION

PATENT NO. : 5,102,924
DATED : April 7, 1992
INVENTOR(S) : Jerry W. Williams et al It is certified that error appears in the above-identified patent and that said Letters Patent is hereby corrected as shown below:

Col. 24, line 58, "claim 2" should read --claim 11--.

Signed and Sealed this

Thirtieth Day of November, 1993

BRUCE LEHMAN

Attest:

Attesting Officer

Commissioner of Patents and Trademarks